United States Patent [19]
Garg et al.

[11] Patent Number: 5,333,776
[45] Date of Patent: Aug. 2, 1994

[54] ATMOSPHERES FOR BRAZING ALUMINUM AND ALUMINUM ALLOYS

[75] Inventors: Diwakar Garg, Macungie; Kerry R. Berger, Lehighton; Donald P. Eichelberger, Macungie, all of Pa.

[73] Assignee: Air Products and Chemicals, Inc., Allentown, Pa.

[21] Appl. No.: 129,896

[22] Filed: Sep. 30, 1993

[51] Int. Cl.$^5$ .................... B23K 1/008; B23K 35/38
[52] U.S. Cl. ................... 228/219; 228/262.51; 432/23
[58] Field of Search ............... 228/176, 183, 200, 219, 228/222, 262.51, 18, 42; 432/23, 152, 198

[56] References Cited

U.S. PATENT DOCUMENTS

| | | | |
|---|---|---|---|
| 3,951,328 | 4/1976 | Wallace et al. | 228/207 |
| 3,971,501 | 7/1976 | Cooke | 228/248 |
| 4,475,960 | 10/1984 | Yamawaki et al. | 148/26 |
| 4,670,067 | 6/1987 | Suzuki et al. | 148/26 |
| 4,689,092 | 8/1987 | Suzuki et al. | 148/26 |
| 5,071,058 | 12/1991 | Nowotarski | 228/219 |
| 5,076,487 | 12/1991 | Bandyopadhyay | 228/219 |
| 5,176,307 | 1/1993 | Hagerty et al. | 228/37 |
| 5,240,169 | 8/1993 | Gileta | 228/219 |
| 5,251,374 | 10/1993 | Halstead et al. | 228/183 |

FOREIGN PATENT DOCUMENTS

| | | |
|---|---|---|
| 0541259 | 10/1992 | European Pat. Off. . |
| 2-55663 | 2/1990 | Japan . |

OTHER PUBLICATIONS

W. E. Cooke & D. H. Bowman, "Tunnel Furnace Brazing of Aluminum Using a Non-Corrosive Flux" Welding Journal Oct. 1980 pp. 17–20.

Cooke, et al, "Furnace Brazing of Aluminum with a Non-Corrosive Flux" Society of Automotive Engineers, Inc., Feb. 27–Mar. 3 1978 pp. 1–10.

Claydon, "Brazing Aluminum Automotive Heat Exchanger Assemblies Using a Non-Corrosive Flux Process", SAE Technical Paper Series, Feb. 28–Mar. 4, 1983 pp. 1–9.

Boswell, "Advanced Aluminum Brazing Using a Non-corrosive Flux", Spring, Summer 1990, Metal Minutes pp. 6–7.

Heisler, et al, "Atmosphere Aluminum Brazing Combining Efficient Equipment and Process", Fall/Winter 1992, Metal Minutes pp. 6–7&11.

*Primary Examiner*—Samuel M. Heinrich

[57] ABSTRACT

Aluminum or aluminum alloys are brazed in the presence of a non-corrosive flux using a low-cost, substantially dry nitrogen atmosphere produced by a non-cryogenic air separation technique such as a pressure swing adsorption (PSA) or a selective permeation (membrane). The use of a substantially dry, non-cryogenically produced nitrogen atmosphere brazed aluminum or aluminum alloy components with consistent good brazed joint quality and appearance while utilizing low loading of the flux.

6 Claims, 11 Drawing Sheets

Figure 2a
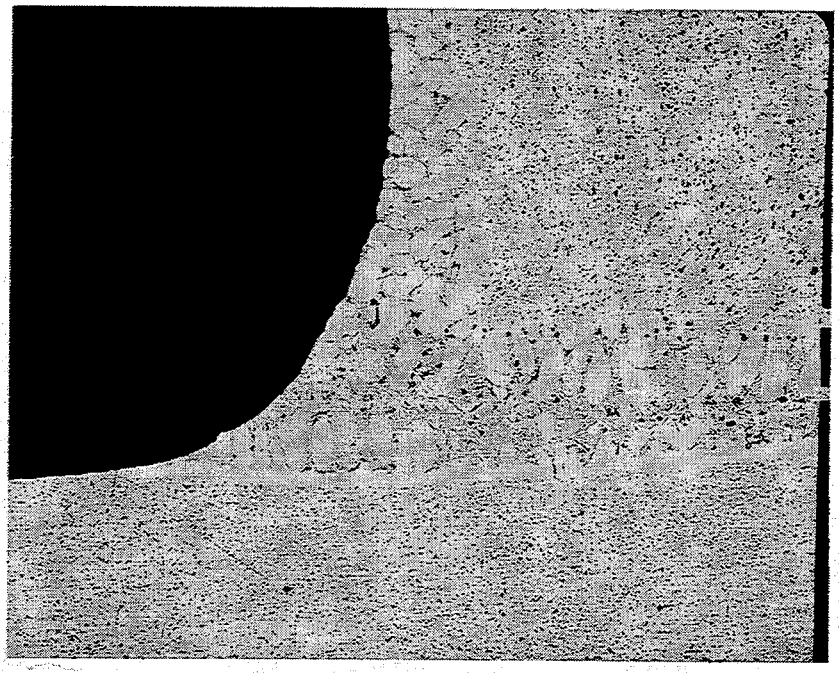
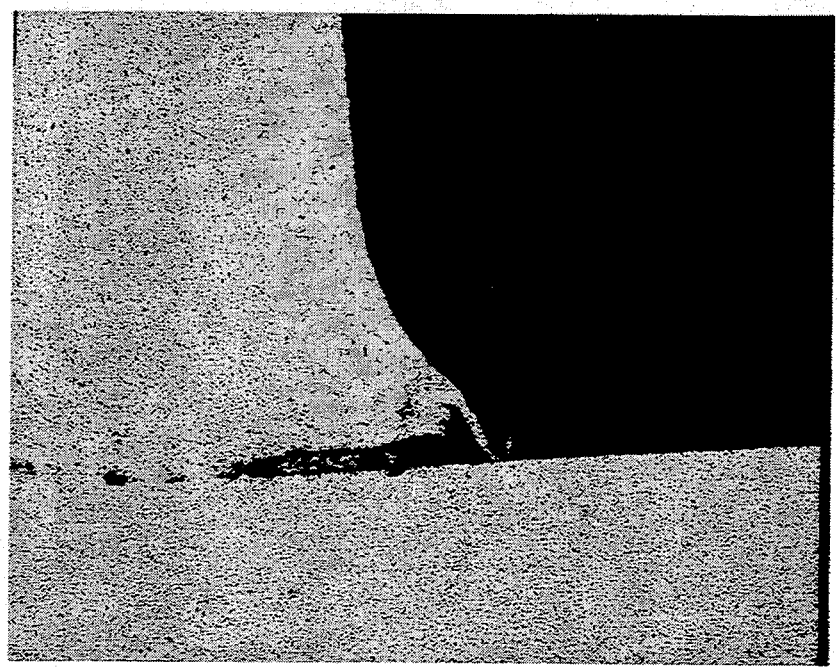
Figure 2b

ATMOSPHERES FOR BRAZING ALUMINUM AND ALUMINUM ALLOYS

FIELD OF THE INVENTION

The present invention pertains to joining aluminum or aluminum alloys by brazing.

BACKGROUND OF THE INVENTION

The brazing of aluminum involves joining surfaces of aluminum or aluminum alloy components with a brazing alloy, i.e. an alloy of aluminum with a melting point substantially lower than that of the components. The components are joined by juxtaposing them with the brazing alloy adjacent to or between them, and heating to a temperature that will effect melting of the brazing alloy without melting the components.

A flux consisting of salts of alkali metals or alkaline earth metal chlorides or fluorides is employed to remove aluminum oxide coatings present on the exposed metal and brazing alloy surfaces and to promote the flow of brazing alloy while brazing aluminum or aluminum alloys. Fluoride-based fluxes such as mixtures of $K_3AlF_6$ and $KAlF_4$, classified as non-corrosive fluxes, are generally preferred over chloride-based fluxes for brazing aluminum or aluminum alloys because they (1) are nonhygroscopic and substantially water insoluble after brazing, (2) leave water insoluble residue after brazing, and (3) are inert or non-corrosive with respect to aluminum or aluminum alloys at brazing temperatures.

Aluminum or aluminum alloy components are generally brazed using the above fluoride-based (or non-corrosive) fluxes in the presence of a protective inert atmosphere such as pure nitrogen gas, as described in U.S. Pat. Nos. 3,951,328, 3,971,501, 4,475,960, and SAE Technical Paper 780300 titled "Furnace Brazing Aluminum with a Non-Corrosive Flux" published in 1978, and SAE Technical Paper 830021 titled "Brazing Aluminum Automotive Heat Exchanger Assemblies Using a Non-Corrosive Flux Process" published in 1983. Some of these fluoride-based, non-corrosive fluxes are marketed by the Aluminum Co. of Canada, Ltd. under the tradmark NOCOLOK. The use of an inert, pure nitrogen gas facilitates brazing of aluminum or aluminum alloys with good brazed joint quality consistently and reproducibly while utilizing low loading of a non-corrosive flux.

Japanese Patent Application No. 63-205318 discloses a method for brazing aluminum or aluminum alloys using a non-corrosive flux in a modified continuous furnace. According to this application, pure nitrogen gas is made to flow in such a way that the inside of the heating zone of the furnace has a nitrogen atmosphere with a dew point of −40° C. or below and an oxygen concentration of 1,000 ppm or less. The thrust of the invention is to minimize air infiltration into the furnace.

Inert, pure nitrogen gas is produced by cryogenic distillation of air. It contains very low moisture and residual oxygen (less than −60 C. dew point and 5 ppm of residual oxygen). Since inert, pure nitrogen gas produced by cryogenic distillation of air is expensive to produce, it is increasingly becoming uneconomical to continue using use it for brazing aluminum or aluminum alloys.

Aluminum or aluminum alloys can be brazed in an inexpensive room air provided high loading (large quantities) of a non-corrosive flux is employed. High loading of a flux is used primarily to compensate for the presence of high levels of oxygen and moisture in the room air. Besides being expensive, the use of high loading of a flux is not desirable because it leaves a large amount of flux residue on the parts resulting in an unattractive appearance of the brazed assembly.

In view of the foregoing state of the art a need existed for a low-cost atmosphere process for brazing aluminum or aluminum alloys with consistent good brazed joint quality and appearance while utilizing low loading of a non-corrosive flux.

SUMMARY OF THE INVENTION

According to the present invention, aluminum or aluminum alloys can be brazed in the presence of a non-corrosive flux using a low-cost nitrogen gas produced by a non-cryogenic generation technique such as a pressure swing adsorption (PSA) or a selective permeation (membrane). Using non-cryogenically produced nitrogen in the process of the invention resulted in brazed aluminum or aluminum alloy components with consistent good brazed joint quality and appearance while utilizing low loading of a non-corrosive flux.

According to the present invention, aluminum or aluminum alloys are brazed in a batch or a continuous furnace operated above about 500° C. in the presence of low loading of a non-corrosive flux using a low-cost, non-cryogenically produced nitrogen atmosphere containing residual oxygen varying from about 0.05 to 15.0% and moisture content below about −40° C.

BRIEF DESCRIPTION OF THE DRAWING

FIG. 2a is a photomicrograph of a satisfactorily brazed joint obtained with dry air having a −55° C. dew point while utilizing low loading of a non-corrosive flux (magnification 50X).

FIG. 2b is a photomicrograph of an unsatisfactorily brazed joint similar to FIG. 2a obtained with dry air having a −55° C. dew point while utilizing low loading of a non-corrosive flux (magnification 50X).

DETAILED DESCRIPTION OF THE INVENTION

Figure 1:
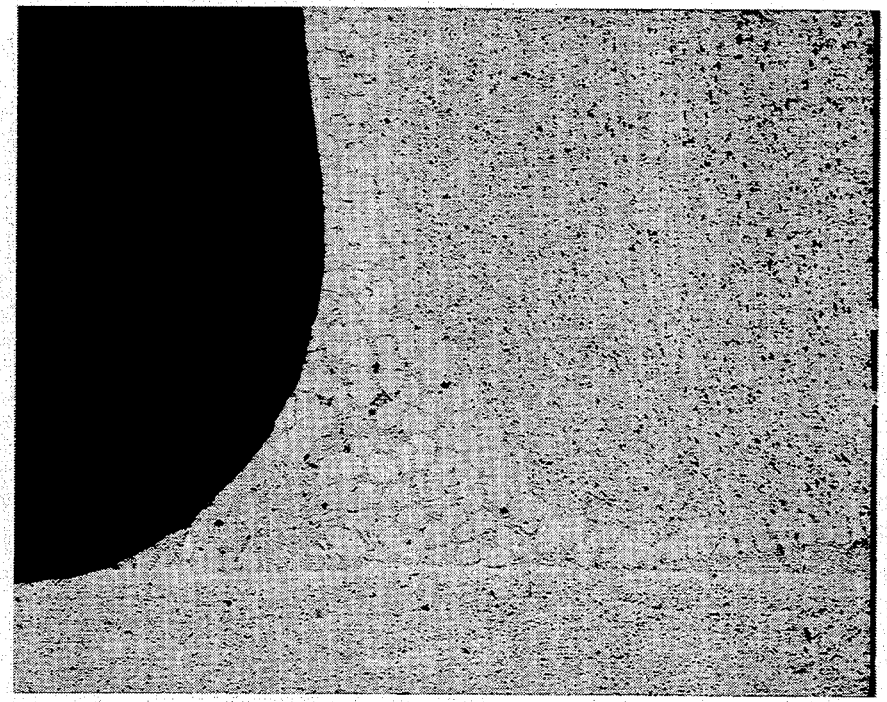
FIG. 1 is a photomicrograph of a brazed joint obtained with pure, dry, cryogenically produced nitrogen while utilizing low loading of a non-corrosive flux (Magnification 50X).

Brazing of aluminum involves joining surfaces of aluminum or aluminum alloys with a aluminum alloy, i.e. an alloy of aluminum with a melting point lower than that of the components. The components are joined by juxtaposing them with the brazing alloy adjacent to or between them, and heating the sandwich or composite of the parts to be brazed and brazing alloys to a temperature that will effect melting of the brazing alloy without melting the components. It is generally preferred that the melting point of the brazing alloy be at least 30 to 40° C. lower than that of the components.

The brazing alloy can be placed adjacent to or interposed between the surfaces to be joined as a discrete sheet or body or in particulate form. A layer of the brazing alloy can also be pre-clad on at least one of the surfaces to be joined. It can also be applied by mixing it with a non-corrosive flux as described in U.S. Pat. No. 3,971,501 the specification of which are incorporated herein by reference.

A flux is generally employed to remove aluminum oxide coatings present on the exposed metal and brazing alloy surfaces and to promote the flow of brazing alloy while brazing aluminum or aluminum alloys. It is applied in a manner to contact all exposed metal surfaces and brazing alloy surfaces prior to application of brazing heat. The flux must be of the type to dissolve and/or remove aluminum oxides at the brazing temperatures, to inhibit re-formation of aluminum oxides, and to be essentially inert with respect to aluminum or aluminum alloys. Since fluxes are usually reactive only when at least partially molten, it is generally required that the flux be partly or wholly molten at the brazing temperature or at temperature not substantially higher that the melting temperature of the brazing alloy.

Various salts of alkali metal or alkaline earth metal chlorides have been commercially used as a flux for brazing aluminum or aluminum alloys. They are however not preferred as a flux for brazing aluminum or aluminum alloys because they are water soluble and react with aluminum in the presence of moisture. Furthermore, the components brazed in the presence of chloride salts need to be washed thoroughly to remove the water soluble flux residue from the surface of the components prior to their use.

Salts of alkali metal or alkaline earth metal fluorides such as mixtures of $AlF_3$ and $KF$ have been commercially used as a flux for brazing aluminum or aluminum alloys. They are generally hygroscopic and are therefore not suitable for use in aqueous slurry.

Alkaline metal or alkaline earth metal fluoroaluminum complexes such as mixtures of $K_3AlF_6$ and $KAlF_4$, mixtures of $K_3AlF_6$, $KAlF_4$, and $Li_3AlF_6$, etc. have also been commercially used as a flux for brazing aluminum or aluminum alloys. The use of these mixtures as a flux is generally preferable because they (1) are nonhygroscopic and substantially water insoluble before and after brazing, (2) leave water insoluble residue after brazing, and (3) are inert with respect to aluminum or aluminum alloys at brazing temperatures. They are classified as non-corrosive fluxes.

Aluminum or aluminum alloy components are brazed using a non-corrosive flux in the presence of a protective inert atmosphere such as pure nitrogen gas, as described in U.S. Pat. No. 3,951,328, U.S. Pat. No. 3,971,501, and U.S. Pat. No. 4,475,960, European Patent Application 92309353.8, SAE Technical Paper 780300 titled "Furnace Brazing Aluminum with a Non-Corrosive Flux" published in 1978, and SAE Technical Paper 830021 titled "Brazing Aluminum Automotive Heat Exchanger Assemblies Using a Non-Corrosive Flux Process" published in 1983. They can be brazed with consistent good brazed joint quality and appearance in an inert, pure nitrogen gas using low loading (small amount) of a non-corrosive flux.

The inert, pure nitrogen gas is produced by cryogenic distillation of air. It contains very low moisture and residual oxygen contents (less than −60° C. dew point and 5 ppm of residual oxygen). It is however becoming uneconomical to continue using cryogenically produced nitrogen for aluminum brazing because it is expensive.

Aluminum or aluminum alloys can be brazed in an inexpensive room air provided high loading (large amounts) of a flux is employed. High loading of a flux is used primarily to compensate for the presence of high levels of oxygen and moisture in the room air. Besides being expensive, the use of high loading of a flux is not desirable because it leaves a large amount of flux residue on the components and provides them an unattractive appearance.

It is believed that high loading of a non-corrosive flux is required to compensate both for the presence of an uncontrolled amount of moisture and high level of oxygen present in the room air. The moisture present in the brazing atmosphere is believed to react with a part of the non-corrosive flux, reducing its effectiveness and concomitantly requiring higher loading. The high level of oxygen (about 21% by volume) in the brazing atmosphere, on the other hand, is believed to interfere with the efficiency of the non-corrosive flux to dissolve oxides and to prevent the reformation of oxides on the surfaces of the components and brazing alloy, thereby requiring higher loading.

It is believed that aluminum or aluminum alloys can be brazed with consistent good brazed joint quality in room air with high loading of a non-corrosive flux provided the room air is dried prior to its use. It is also believed that the amount of a non-corrosive flux required for brazing aluminum or aluminum alloys can be reduced by limiting the level of oxygen present in the brazing atmosphere.

According to the present invention the amount of a non-corrosive flux required for brazing aluminum or aluminum alloys can be reduced and the use of an inert, pure, and expensive cryogenically produced nitrogen gas can be eliminated by using a dry, low-oxygen containing, non-cryogenically produced nitrogen atmosphere. The nitrogen atmosphere can preferably be produced at substantially lower cost by well known non-cryogenic air separation techniques such as pressure swing adsorption (PSA) or selective permeation (membrane). It can alternatively be produced by blending pure, dry, cryogenically produced nitrogen or dry, non-cryogenically produced nitrogen containing low residual oxygen with dry air.

According to the present invention, aluminum or aluminum alloy components are brazed in a batch or continuous furnace operated above 500° C. with low loading of a non-corrosive flux using low-cost, non-cryogenically produced nitrogen atmosphere.

The maximum amount of moisture that can be present in the nitrogen atmosphere used for brazing aluminum or aluminum alloys while utilizing low loading of a non-corrosive flux is limited to below about −40° C., preferably below about −50° C., more preferably below about −55° C. The amount of oxygen present in the nitrogen atmosphere can vary from about 0.05% to about 15%, preferably from about 0.5% to about 10% more preferably from about 1.0% to about 5%.

Non-corrosive fluxes suitable for brazing aluminum or aluminum alloys according to the present invention consist of alkaline metal or alkaline earth metal fluoroaluminum complexes such as mixtures of $K_3AlF_6$ and $KAlF_4$, mixtures of $K_3AlF_6$, $KAlF_4$, and $Li_3AlF_6$, etc. referred to above.

Brazing alloys may be an Al-Si alloy such as Al-7.5%Si, Al-10%Si or Al-12%Si that is conventionally used for brazing aluminum or aluminum alloy components. Any other brazing alloy that is suitable for brazing aluminum (e.g., having a melting point appropriately lower than that of the components being brazed) can be used in the process of the present invention.

In a preferred embodiment, aluminum or aluminum alloy components are brazed in a batch or a continuous furnace operated above about 600° C. utilizing low loading of a non-corrosive flux in a non-cryogenically produced nitrogen atmosphere having a moisture content measured in terms of dew point less than −50° C. and a residual oxygen content less than about 5.0%.

A number of brazing experiments were carried out in a Watkins-Johnson continuous conveyor belt furnace operated at about 630° C. The furnace consisted of an 8.75 in. wide, 4.9 in. high, and 86 in. long heating zone and a 90 in. long cooling zone. A flexible conveyor belt with a fixed belt speed of 7 in per minute was used to feed aluminum components into the furnace for brazing in all the experiments. A total flow rate of about 350 SCFH of pure nitrogen, humid air, dry air, or non-cryogenically produced nitrogen was introduced into the shock zone (or a zone located between the heating and cooling zones of the furnace as a brazing atmosphere for brazing aluminum components.

For all tests automobile air conditioning components made of AA-3003 aluminum alloy containing 1.2% Mn, 0.12% Cu, balance aluminum were brazed using AA-4343 Al-Si brazing alloy containing 7.5% Si. A thin layer of brazing alloy was pre-clad on one of the surfaces to be joined.

A proprietary, substantially water insoluble, non-corrosive fluoride based flux supplied in the powder form by Lucas-Milhaupt, Inc. of Cudahy, Wis. formed into a slurry by suspending three parts of powder flux in one part of water was used in all the tests. The slurry was applied to all the joints either as a very thin (low loading) or a very thick (high loading) film with the help of a paint brush. The amount of flux present in the very thick (high loading) film was at least three times the amount present in the very thin (low loading) film.

EXAMPLE 1

A set of components were brazed at 630° C. in pure, inert, and dry (dew point less than −55° C.) cryogenically produced nitrogen using AA-4343 pre-clad Al-7.5%Si brazing alloy and a very thin film (low loading) of a non-corrosive, fluoride-based flux. All the components were brazed with good fillet formation and brazed joint quality similar to that in FIG. 1.

This example showed that aluminum or aluminum alloys can be brazed with good brazed joint quality in the presence of pure, inert, and dry nitrogen while utilizing low loading of a non-corrosive, fluoride-based flux.

EXAMPLE 2

The brazing procedure described in Example 1 was repeated two times using similar components, i.e., pre-clad brazing alloy, and the same amount of flux (low loading) with the exception of using very dry air with less than −55° C. dew point (moisture content of less than 25 ppm). All the components were brazed with inconsistent brazed joint quality—some of them were brazed with good brazed joint quality (FIG. 2a) while the others with poor brazed joint quality (FIGS. 2b).

This example showed that aluminum or aluminum alloys cannot be brazed with consistent good brazed joint quality in the presence of very dry air while utilizing low loading of a non-corrosive, fluoride-based flux.

EXAMPLE 3

Figure 3:
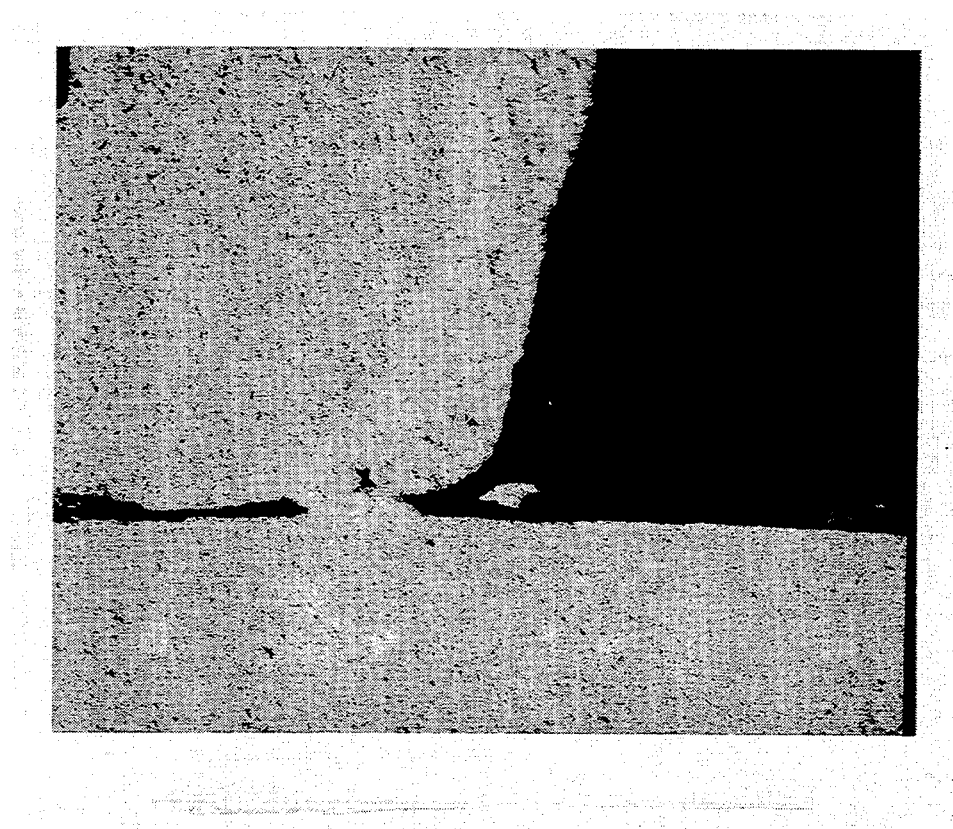
FIG. 3 is a photomicrograph of a poor quality of a brazed joint obtained with room air having +15° C. dew point while utilizing low loading of a non-corrosive flux (Magnification 50X).

The brazing procedure described in Example 1 was repeated two times using similar components, i.e., pre-clad brazing alloy, and the same amount of flux (low loading) with the exception of using room air with about +15° C. dew point (moisture content of about 1.4%). All the components were brazed with very poor fillet formation and brazed joint quality similar to the one shown in FIG. 3.

This example showed that aluminum or aluminum alloys cannot be brazed with good brazed joint quality in the presence of humid room air while utilizing low loading of a non-corrosive, fluoride-based flux.

EXAMPLE 4

The brazing procedure described in Example 3 was repeated two times using room air with about −2° C. dew point (moisture content of about 0.51%) and about −12° C. dew point (moisture content of about 0.18%). All the components in these examples were brazed with very poor fillet formation and brazed joint quality similar to the one shown in FIG. 3.

These examples once again showed that aluminum or aluminum alloys cannot be brazed with good brazed joint quality in the presence of humid room air while utilizing low loading of a non-corrosive, fluoride-based flux.

EXAMPLE 5

Figure 4:
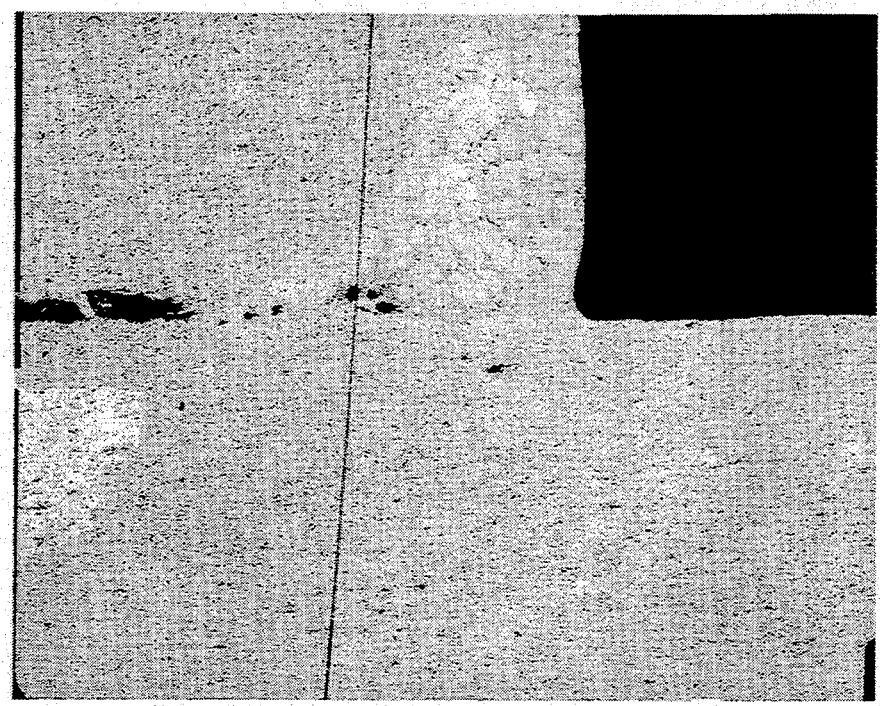
FIG. 4 is a photomicrograph of a poor quality brazed joint obtained with room air having +15° C. dew point while utilizing high loading of a non-corrosive flux (Magnification 50X).

The brazing procedure described in Example 3 was repeated two times using similar components, i.e., pre-clad brazing alloy, and room air with about +15° C. dew point (moisture content of about 1.4%) with the exception of using a very thick film (high loading) of a non-corrosive, fluoride-based flux. All the components were brazed with poor fillet formation and brazed joint quality similar to the one shown in FIG. 4.

This example showed that aluminum alloys cannot be brazed with good brazed joint quality in the presence of humid room air even with high loading of a non-corrosive, fluoride-based flux.

EXAMPLE 6

Figure 5:
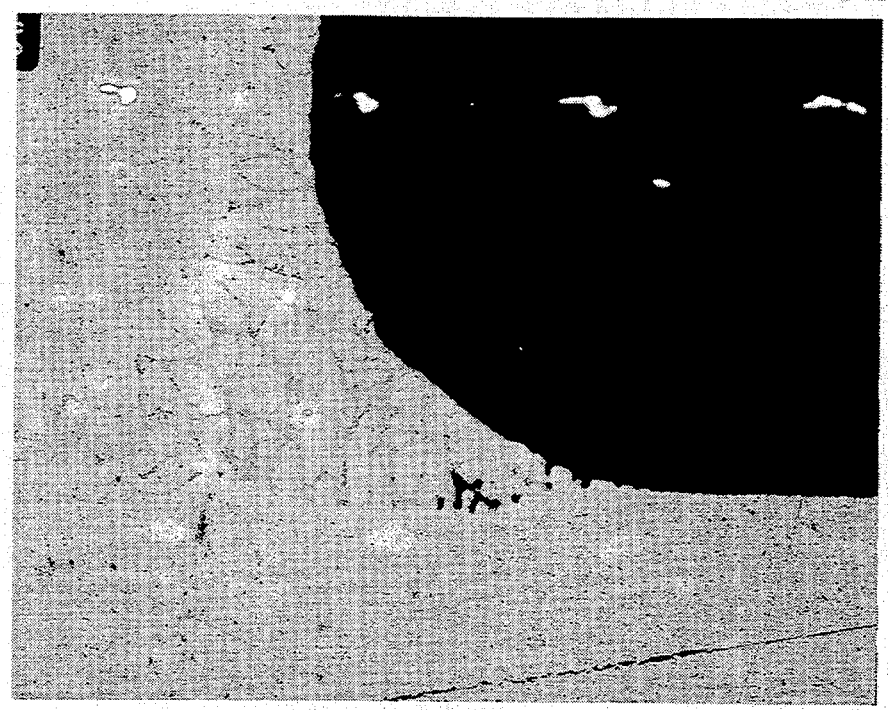
FIG. 5 is a photomicrograph of a marginal quality brazed joint obtained with room air having −2° C. dew point while utilizing high loading of a non-corrosive flux (Magnification 50X).
Figure 6:
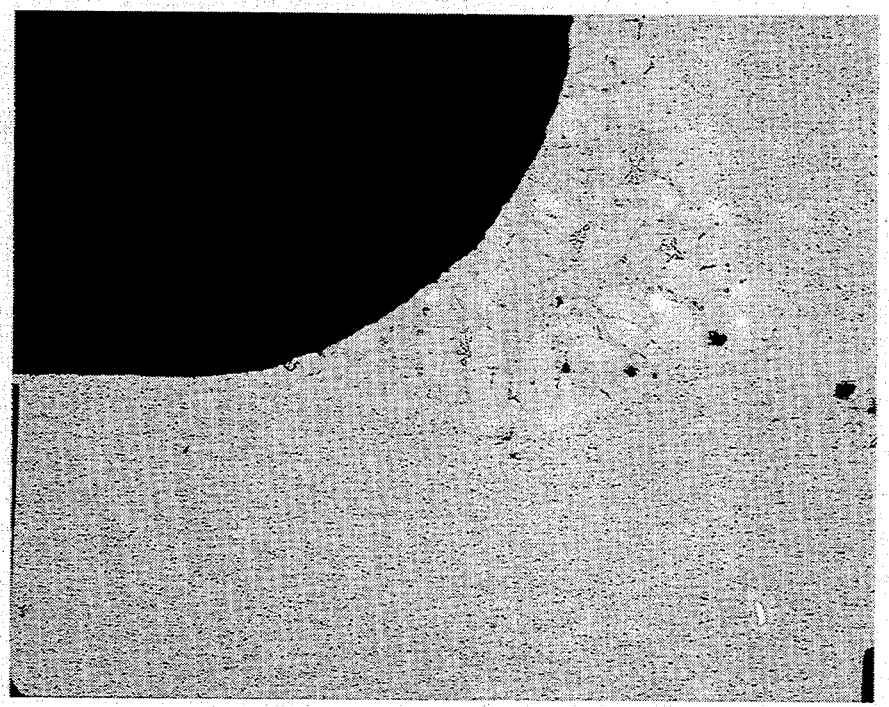
FIG. 6 is a photomicrograph of a good quality brazed joint obtained with room air having −12° C. dew point while utilizing high loading of a non-corrosive flux (Magnification 50X).

The brazing procedure described in Example 5 was repeated two times using room air with about −2° C. dew point (moisture content of about 0.51%) and about −12° C. dew point (moisture content of about 0.18%). Components brazed in −2° C. dew point room air showed presence of voids and marginal brazed joint quality similar to the one shown in FIG. 5. On the other hand, components brazed in −12° C. dew point room air showed good fillet formation and brazed joint quality similar to the one shown in FIG. 6.

These examples showed that aluminum alloys cannot be brazed with good brazed joint quality in room air containing close to 0.5% moisture even with the use of high loading of a non-corrosive, fluoride-based flux. They also showed that aluminum alloys can be brazed with good brazed joint quality in room air containing less than 0.2% moisture with high loading of a non-corrosive, fluoride-based flux.

The above examples showed that aluminum or aluminum alloys can be brazed with good brazed joint quality consistently in the presence of pure, dry, cryogenically produced nitrogen gas while utilizing low loading of a non-corrosive, fluoride-based flux. They also showed that aluminum or aluminum alloys cannot be brazed with consistent good brazed joint quality in the presence of both dry and humid air while utilizing low loading of a non-corrosive, fluoride-based flux. Furthermore, they showed that the moisture content in the room air has to be less than 0.2% (or dew point less than −12° C.) to braze aluminum or aluminum alloys with good brazed joint quality consistently provided high loading of a non-corrosive, fluoride-based flux is used.

EXAMPLE 7

Figure 7:
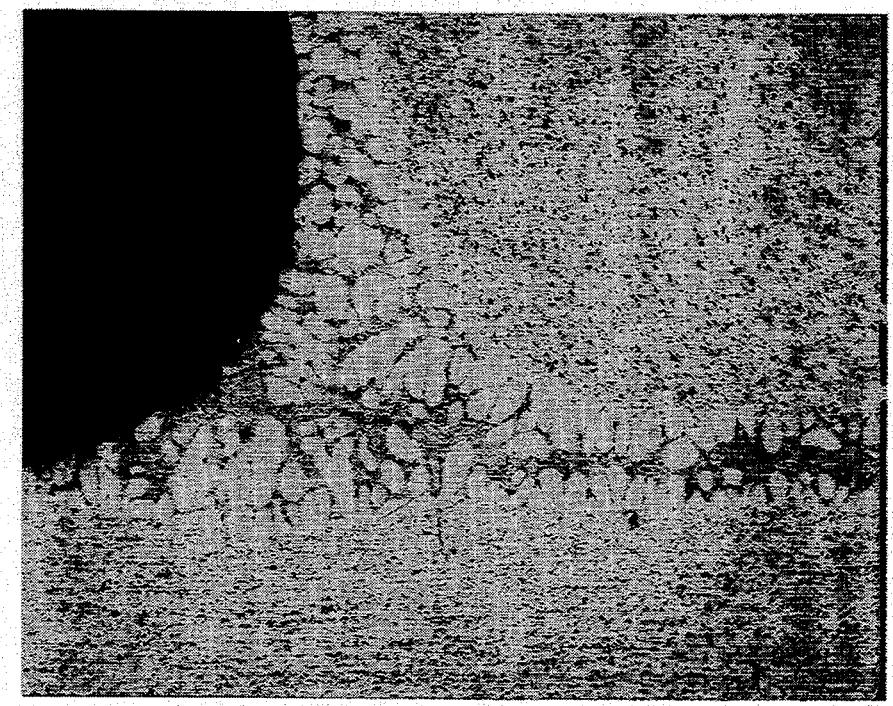
FIG. 7 is a photomicrograph of a good quality brazed joint obtained with dry, non-cryogenically produced nitrogen containing 1% residual oxygen while utilizing low loading of a non-corrosive flux (Magnification 50X).

The brazing procedure described in Example 1 was repeated two times using similar components, i.e., preclad brazing alloy, and the same amount of flux (low loading) with the exception of using non-cryogenically produced nitrogen containing 1% residual oxygen and having a dew point less than −55° C. (moisture content of less than 25 ppm). All the components were brazed with good fillet formation and brazed joint quality similar to the one shown in FIG. 7.

This example showed that aluminum or aluminum alloys can be brazed with good brazed joint quality consistently in the presence of a dry, non-cryogenically produced nitrogen containing 1% residual oxygen while utilizing low loading of a non-corrosive, fluoride-based flux.

EXAMPLE 8

Figure 8:
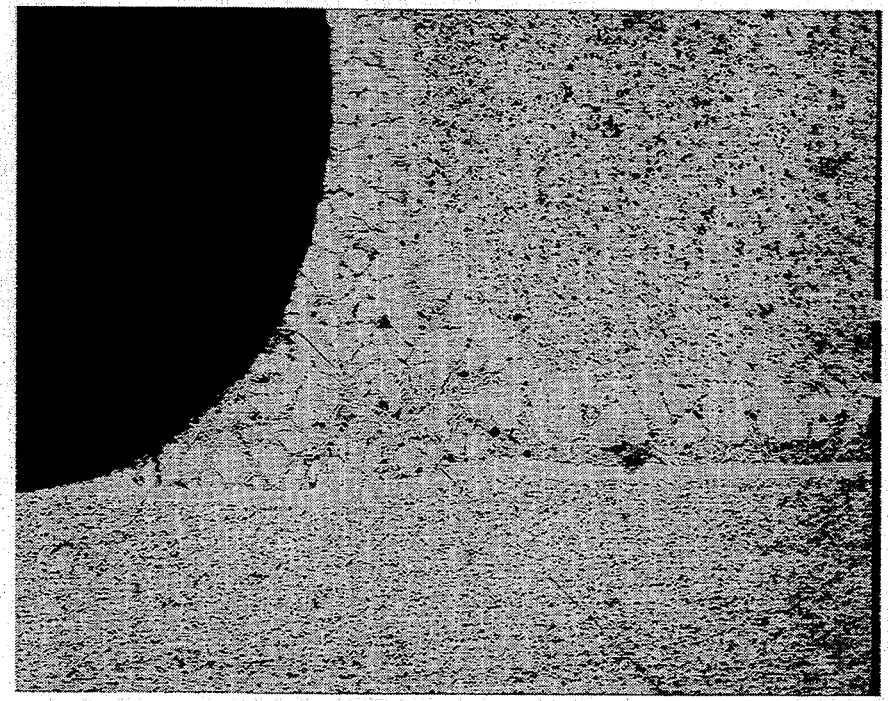
FIG. 8 is a photomicrograph of a good quality brazed joint obtained with dry, non-cryogenically produced nitrogen containing 2% residual oxygen while utilizing low loading of a non-corrosive flux (Magnification 50X).

The brazing procedure described in Example 7 was repeated two times using non-cryogenically produced nitrogen containing 2% residual oxygen and a dew point less than −50° C. (moisture content of less than 30 ppm). All the components were brazed with good fillet formation and brazed joint quality similar to the one shown in FIG. 8.

This example showed that aluminum or aluminum alloys can be brazed with good brazed joint quality consistently in the presence of a dry, non-cryogenically produced nitrogen containing 3% residual oxygen while utilizing low loading of a non-corrosive, fluoride-based flux.

EXAMPLE 9

Figure 9:
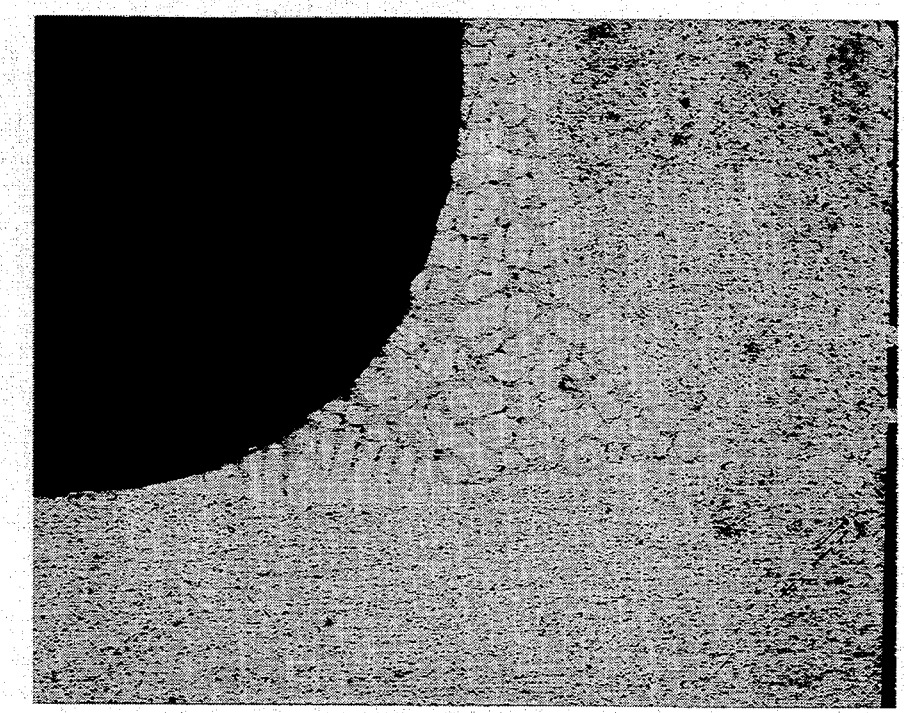
FIG. 9 is a photomicrograph of a good quality brazed joint obtained with dry, non-cryogenically produced nitrogen containing 3% residual oxygen while utilizing low loading of a non-corrosive flux (Magnification 50X).

The brazing procedure described in Example 7 was repeated two times using non-cryogenically produced nitrogen containing 3% residual oxygen and a dew point less than −43° C. (moisture content of less than 100 ppm). All the components were brazed with good fillet formation and brazed joint quality similar to the one shown in FIG. 9.

This example showed that aluminum or aluminum alloys can be brazed with good brazed joint quality consistently in the presence of a dry, non-cryogenically produced nitrogen containing 3% residual oxygen while utilizing low loading of a non-corrosive, fluoride-based flux.

Example 10

Figure 10:
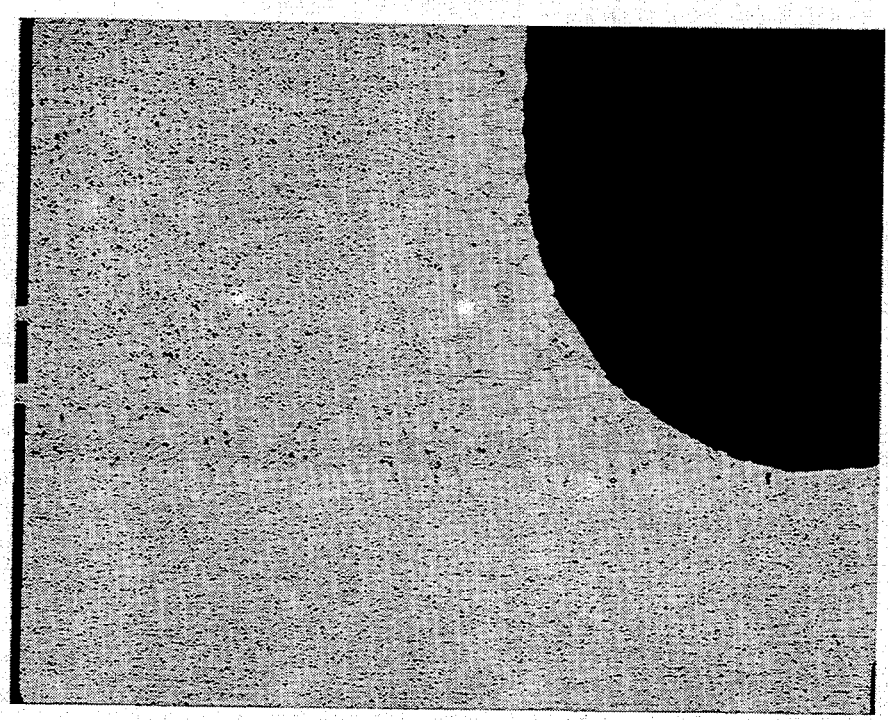
FIG. 10 is a photomicrograph of a good quality brazed joint obtained with dry, non-cryogenically produced nitrogen containing 5% residual oxygen while utilizing low loading of a non-corrosive flux (Magnification 50X).

The brazing procedure described in Example 7 was repeated two times using non-cryogenically produced nitrogen containing 5% residual oxygen and a dew point less than −55° C. (moisture content of less than 25 ppm). All the components were brazed with good fillet formation and brazed joint quality similar to the one shown in FIG. 10.

This example showed that aluminum or aluminum alloys can be brazed with good brazed joint quality consistently in the presence of a dry, non-cryogenically produced nitrogen containing 5% residual oxygen while utilizing low loading of a non-corrosive, fluoride-based flux.

EXAMPLE 11

Figure 11:
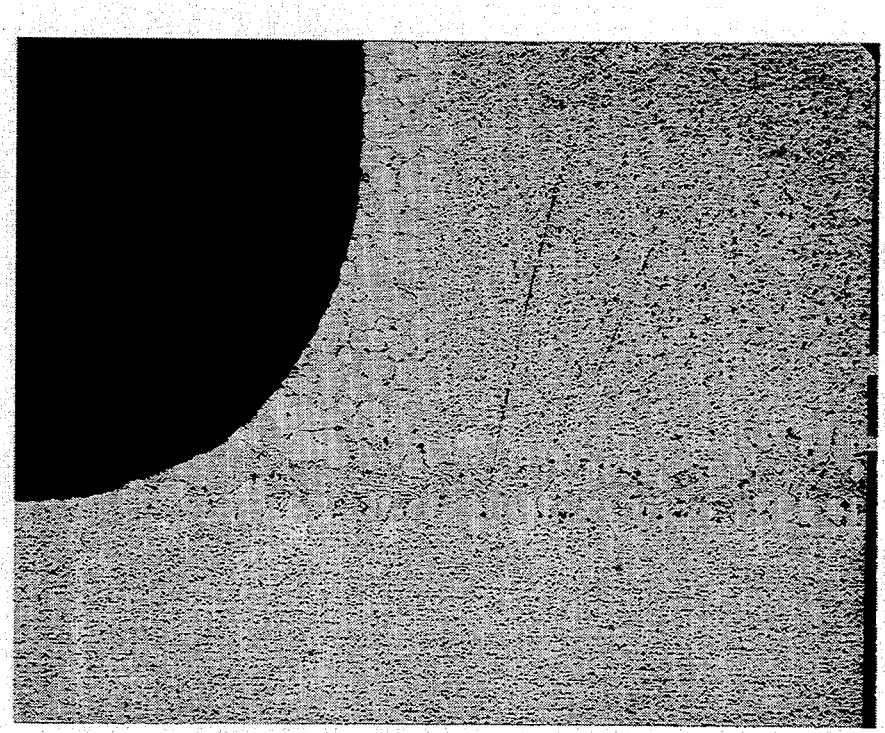
FIG. 11 is a photomicrograph of a good quality brazed joint obtained with dry, non-cryogenically produced nitrogen containing 10% residual oxygen while utilizing low loading of a non-corrosive flux (Magnification 50X).

The brazing procedure described in Example 7 was repeated two times using non-cryogenically produced nitrogen containing 10% residual oxygen and a dew point less than −55° C. (moisture content of less than 25 ppm). All the components were brazed with good fillet formation and brazed joint quality similar to the one shown in FIG. 11.

This example showed that aluminum or aluminum alloys can be brazed with good brazed joint quality consistently in the presence of a dry, non-cryogenically produced nitrogen containing 10% residual oxygen while utilizing low loading of a non-corrosive, fluoride-based flux.

The above examples clearly showed that aluminum or aluminum alloys can be brazed with good brazed joint quality consistently in the presence of low-cost, dry (moisture content less than 100 ppm), non-cryogenically produced nitrogen gas containing up to 10% residual oxygen while utilizing low loading of a non-corrosive, fluoride-based flux.

We claim:

1. A method for brazing aluminum or aluminum alloys comprising the steps of
   juxtaposing the parts to be brazed with a brazing alloy and low loading of a non-corrosive flux therebetween;
   heating said juxtaposed parts in a furnace heated to a temperature of at least 500° C.;

simultaneously injecting into said furnace non-cryogenically produced nitrogen gas having a dew point less than −40° C. and an oxygen control of between 0.05 and 15% by volume; and maintaining said parts at temperature and under atmosphere until said brazing is complete.

2. A process according to claim 1 including placing a brazing alloy consisting of aluminum or aluminum alloy having a melting point lower than that of the parts being brazed between the parts to be brazed.

3. A process according to claim 1 including applying a flux of an alkaline metal or alkaline earth metal fluoroaluminum complex to the exposed surfaces of the juxtaposed parts.

4. A process according to claim 1 including maintaining the dew point of the non-cryogenically produced nitrogen below −50° C.

5. A process according to claim 1 including maintaining the dew point of the non-cryogenically produced nitrogen below −55° C.

6. A process according to claim 1 including maintaining the oxygen content of the non-cryogenically produced nitrogen between 1.0 and 5% by volume.

* * * * *